United States Patent [19]
Kwon

[11] Patent Number: 6,141,716
[45] Date of Patent: *Oct. 31, 2000

[54] INTERBUS DATA FLOW CONTROL SYSTEM FOR REALIGNING DATA BY BYTE SWAPPING AND BYTE SAMPLING

[75] Inventor: Ki-Young Kwon, Kwangmyung, Rep. of Korea

[73] Assignee: Hyundai Electronics Industries Co., Ltd., Kyoungki-Do, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 09/141,578

[22] Filed: Aug. 28, 1998

[30] Foreign Application Priority Data

Jan. 23, 1998 [KR] Rep. of Korea .......................... 98-2012

[51] Int. Cl.$^7$ .............................. G06F 13/00; G06F 13/38; G06F 3/00
[52] U.S. Cl. .............................. 710/128; 710/52; 710/129
[58] Field of Search ...................................... 710/126–129, 710/100, 33, 65, 52, 1; 712/300; 711/100

[56] References Cited

U.S. PATENT DOCUMENTS

| | | |
|---|---|---|
| 4,437,166 | 3/1984 | O'Brien . |
| 5,007,020 | 4/1991 | Inskeep . |
| 5,455,913 | 10/1995 | Shrock et al. . |
| 5,502,821 | 3/1996 | Nguyen et al. . |
| 5,592,684 | 1/1997 | Gaskins et al. . |
| 5,867,690 | 2/1999 | Lee et al. . |
| 5,898,896 | 4/1999 | Kaiser et al. . |
| 5,961,640 | 10/1999 | Chambers et al. . |

*Primary Examiner*—Gopal C. Ray

[57] ABSTRACT

A system and method for controlling a data flow between data buses having different characteristics includes a first bus, a first interface coupled to the first bus, a second bus, a second interface coupled to the second bus, a byte selection unit coupled to the first and second interfaces and transferring data from the first interface to the second interface, or from the second interface to the first interface according to a control signal, and a byte selection control unit storing a plurality of byte selection data and generating at least one of the plurality of byte selection data to the byte selection unit as the control signal. Each byte selection data representing a predetermined byte location.

31 Claims, 5 Drawing Sheets

FIG. 4

| OUTPUT | B0 | B1 | B2 | B3 | B4 | B5 | B6 | B7 | B8 | B9 | BA | BB | BC | BD | BE | BF |
|---|---|---|---|---|---|---|---|---|---|---|---|---|---|---|---|---|
| R[0] | 0 | 1 | 2 | 3 | 4 | 5 | 6 | 7 | 8 | 9 | A | B | C | D | E | F |
| R[1] | F | 0 | 1 | 2 | 3 | 4 | 5 | 6 | 7 | 8 | 9 | A | B | C | D | E |
| R[2] | E | F | 0 | 1 | 2 | 3 | 4 | 5 | 6 | 7 | 8 | 9 | A | B | C | D |
| R[3] | D | E | F | 0 | 1 | 2 | 3 | 4 | 5 | 6 | 7 | 8 | 9 | A | B | C |
| R[4] | C | D | E | F | 0 | 1 | 2 | 3 | 4 | 5 | 6 | 7 | 8 | 9 | A | B |
| R[5] | B | C | D | E | F | 0 | 1 | 2 | 3 | 4 | 5 | 6 | 7 | 8 | 9 | A |
| R[6] | A | B | C | D | E | F | 0 | 1 | 2 | 3 | 4 | 5 | 6 | 7 | 8 | 9 |
| R[7] | 9 | A | B | C | D | E | F | 0 | 1 | 2 | 3 | 4 | 5 | 6 | 7 | 8 |
| L[0] | F | 0 | 1 | 2 | 3 | 4 | 5 | 6 | 7 | 8 | 9 | A | B | C | D | E |
| L[1] | E | F | 0 | 1 | 2 | 3 | 4 | 5 | 6 | 7 | 8 | 9 | A | B | C | D |
| L[2] | D | E | F | 0 | 1 | 2 | 3 | 4 | 5 | 6 | 7 | 8 | 9 | A | B | C |
| L[3] | C | D | E | F | 0 | 1 | 2 | 3 | 4 | 5 | 6 | 7 | 8 | 9 | A | B |
| L[4] | B | C | D | E | F | 0 | 1 | 2 | 3 | 4 | 5 | 6 | 7 | 8 | 9 | A |
| L[5] | A | B | C | D | E | F | 0 | 1 | 2 | 3 | 4 | 5 | 6 | 7 | 8 | 9 |
| L[6] | 9 | A | B | C | D | E | F | 0 | 1 | 2 | 3 | 4 | 5 | 6 | 7 | 8 |
| L[7] | 8 | 9 | A | B | C | D | E | F | 0 | 1 | 2 | 3 | 4 | 5 | 6 | 7 |

INPUT BYTE

INTERBUS DATA FLOW CONTROL SYSTEM FOR REALIGNING DATA BY BYTE SWAPPING AND BYTE SAMPLING

BACKGROUND OF THE INVENTION

1. Field of the Invention

The present invention relates to a system and method for controlling data transmission between different data buses, and more particularly, to a system and method for controlling data realignment using byte selection data representing different byte locations.

2. Description of the Related Art

In general, an interbus data flow control system serves to realign data between different buses and is directed to byte-swapping.

FIG. 1 illustrates an SGC data bus and an i486 data bus. The SGC data bus is of a byte-wise big-endian type and the i486 data bus is of a byte-wise little-endian type. Big-endians and little-endians are divisions according to byte ordering in data buses. That is, a little-endian is provided with a byte ordering structure having a reverse sequential order of "0, 1, 2, 3" starting at the LSB (Least Significant Bit), and a big-endian is provided with a byte ordering structure having a sequential order of "0, 1, 2, 3" staring at the MSB (Most Significant Bit).

As illustrated in FIG. 2, a conventional interbus data flow control apparatus includes a swapping control unit 10 for controlling data flow in a buffer, and a data swapping unit 20 for determining a data flow direction and for transmitting data output from different data buses.

The swapping control unit 10 includes an alignment type determining register 11 for determining whether the alignment of a data transmission bus system for transmitting data is identical to the alignment of a data reception bus system for receiving the data, and a control signal generator 12 for decoding an address signal corresponding to the data transmission bus system in accordance with the determination of the alignment type determining register 11.

The data swapping unit 20 is provided with a first bidirectional buffer 21 adjacent to the SGC data bus and a second bidirectional buffer 22 adjacent to the i486 data bus for determining a data flow direction and transferring data between different buses. A unidirectional buffer 23 in the data swapping unit 20 outputs a control signal to each of the first and second buffers 21 and 22 to output data in accordance with the data flow direction determined in the first or second bidirectional buffer 21 or 22.

With reference to FIGS. 1 and 2, the operation of the above-described conventional data flow control system will now be described in further detail where data is transferred from the SGC data bus to the i486 data bus.

In this example, when a data is transmitted from the SGC data bus to the first bidirectional buffer 21, the alignment type determining register 11 in the swapping control unit 10 determines whether the data bus system for transmitting data is aligned with the i486 data bus system for receiving the data. The alignment type determining register 11 denotes a register with a reference address signal preset thereto in order to determine whether the alignment of the data bus system for transmitting data is identical to that of the data bus system for receiving the transferred data.

In accordance with the determination of the alignment type determining register 11, the control signal generator 12 decodes an address signal for swapping the data and outputs a control signal to control the data swapping unit 20.

The unidirectional buffer 23 in the data swapping unit 20 then outputs a control signal to the first bidirectional buffer 21 in accordance with the control signal output from the control signal generator 12. The first bidirectional buffer 21 receives the control signal from the unidirectional buffer 23 and outputs the data from the SGC data bus to the second bidirectional buffer 22. The second bidirectional buffer 22 outputs the received data to the i486 data bus.

At this time, the 0th byte data (0 to 7 bits) from the SGC data bus are transferred to the third byte location in the i486 data bus through the first and second bi-directional buffers 21 and 22. Similarly, the first byte data (8 to 15 bits) in the SGC data bus are transferred to the second byte location of the i486 data bus, the second byte data (16 to 23 bits) in the SGC data bus are transferred to the first byte location of the i486 data bus, and the third byte data (24 to 31 bits) in the SGC data bus are transferred to the 0th byte location of the i486 data bus. Accordingly, all the data are transferred from the SGC data bus to the i486 data bus and the data are swapped in a reverse order.

However, the conventional interbus data flow control system increases a bus width depending on the data size for transmission and unnecessary data may be disadvantageously transmitted, thereby deteriorating applicability and expandability of data transmission.

SUMMARY OF THE INVENTION

An object of the present invention is to provide an interbus data flow control system and method which overcomes problems and disadvantages of the related art.

Another object of the present invention is to provide an interbus data flow control system and method which performs a byte-swapping or byte-sampling operation when transmitting data between buses having different characteristics to align the transmission and reception bus systems.

To achieve the above-described and other objects, a system for controlling a data flow between different data buses according to the present invention includes a first bus, a first interface coupled to the first bus, a second bus, a second interface coupled to the second bus, a byte selection unit coupled to the first and second interfaces and transferring data from the first interface to the second interface, or from the second interface to the first interface according to a control signal, and a byte selection control unit storing a plurality of byte selection data and outputting at least one of the plurality of byte selection data to the byte selection unit as the control signal, each byte selection data representing a predetermined byte location.

The present invention is also directed to a method of controlling a data flow between data buses, comprising the steps of coupling a first interface to a first bus, coupling a second interface to a second bus, generating at least one of a plurality of byte selection data as a control signal, each byte selection data representing a predetermined data byte location, and transferring data from the first interface to the second interface, or from the second interface to the first interface according to the generated control signal.

The objects and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein:

FIG. 4 is a table illustrating examples of byte selection data stored in a byte selection control unit of the control system shown in FIG. 3 according to the present invention;

DETAILED DESCRIPTION OF THE PREFERRED EMBODIMENTS

With reference to the accompanying drawings, an interbus data flow control system according to the present invention will now be described.

Figure 1:
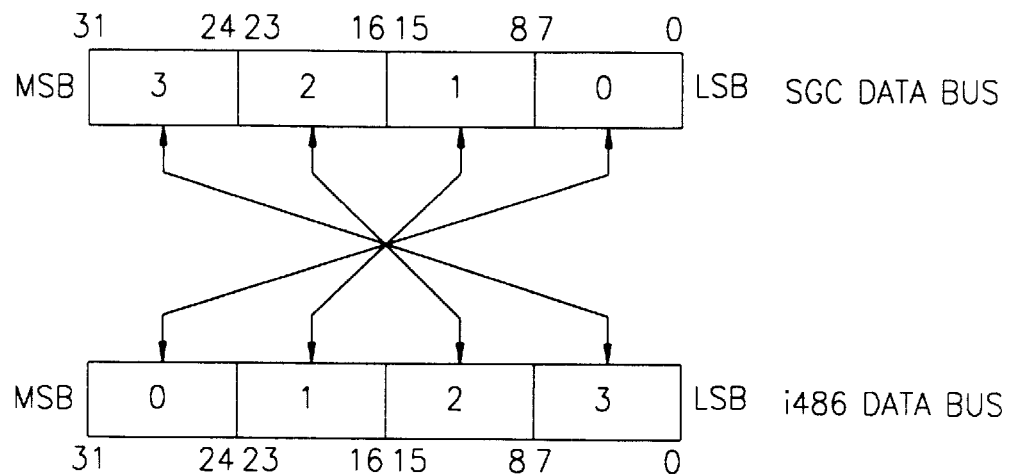
FIG. 1 is a block diagram illustrating a data swapping process of a conventional interbus data flow control system.
Figure 2:
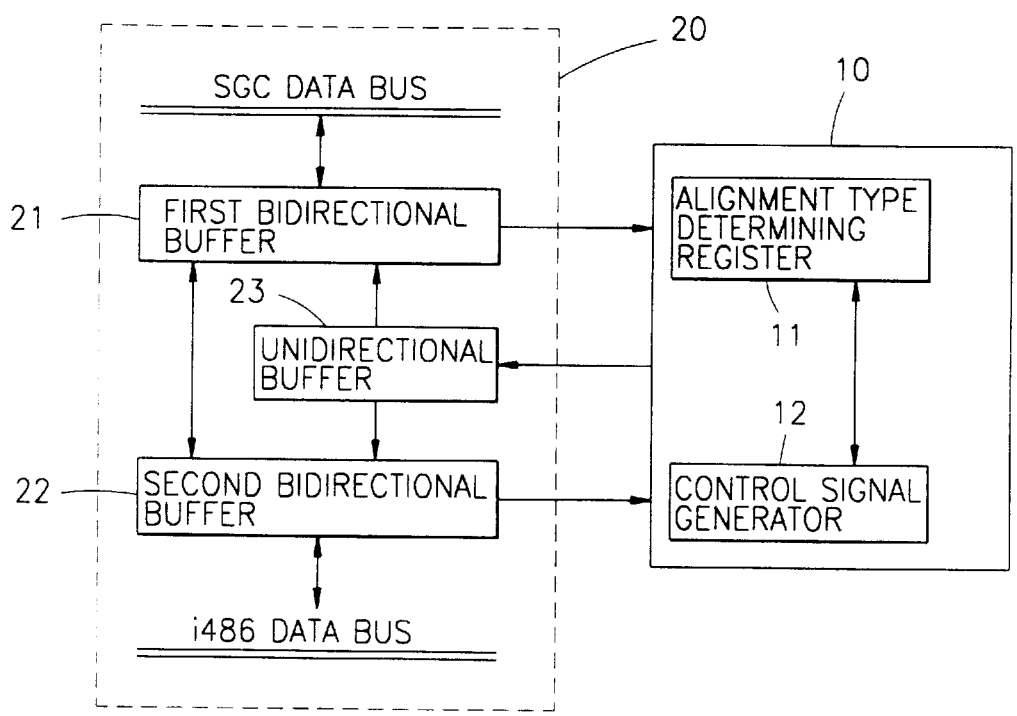
FIG. 2 is a block diagram illustrating the conventional interbus data flow control system.
Figure 3:
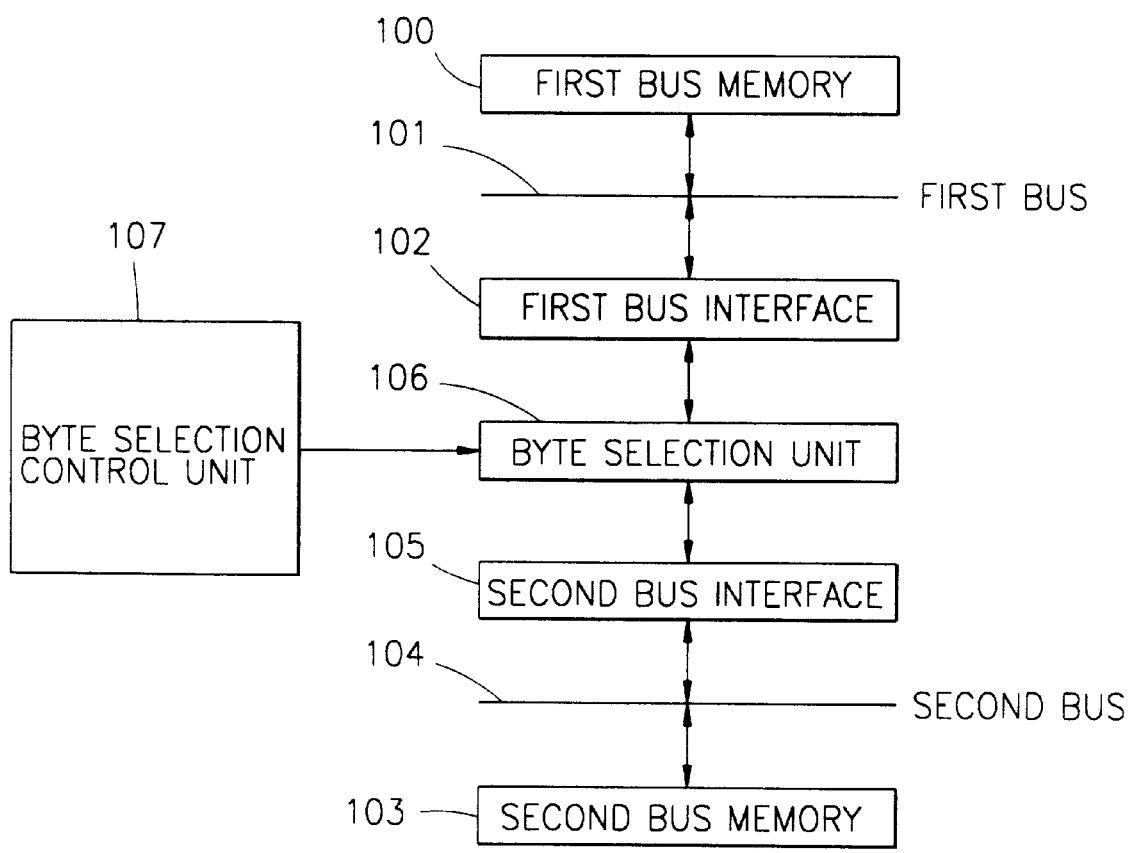
FIG. 3 is a block diagram illustrating an interbus data flow control system according to the embodiments of the present invention.

FIG. 3 is a block diagram illustrating the interbus data flow control system according to the present invention. As illustrated therein, a first bus memory 100 stores therein data loaded on a bus and outputs the stored data to a first bus 101. The first bus 101 communicates with the first bus memory 100 and transmits the data from the first bus memory 100 to a first bus interface 102. The first bus interface 102 receives the data from the first bus 101 and transmits the data to a subsequent stage. The first bus interface 102 also receives realigned data from the subsequent stage and transmits the realigned data to the first bus 101. The first bus 101 transmits the realigned data received from the first bus interface 102 to the first bus memory 100.

A second bus memory 103 stores therein data loaded on a bus and outputs the stored data to a second bus 104. The second bus 104 communicates with the second bus memory 103 and transmits the received data to a second bus interface 105. The second bus interface 105 receives the data from the second bus 104 and transmits the received data to a subsequent stage. The second bus interface 105 also receives realigned data from the subsequent stage and transmits the realigned data to the second bus 104. The second bus 104 then transmits the realigned data received from the second bus 104 to the second bus memory 103.

A byte selection unit 106 realigns the data received from the second bus interface 105 and outputs the realigned data to the first bus interface 102. The byte selection unit 106 also realigns the data received from the first bus interface 102 and outputs the realigned data to the second bus interface 105. A byte selection control unit 107 outputs a control signal to the byte selection unit 106. The control signal includes at least one of the previously stored byte selection data. Upon receipt of the control signal, the byte selection unit 106 realigns the data output from the first or second bus interface 102 or 105 and outputs the realigned data to the other interface 102 or 105.

The first and second buses 101 and 104 include all the data bus concepts of employing a little endian or a big endian bus type, such as the SGC data bus, the i486 data bus according to the conventional art. Other types of data buses may be used as the first and second buses 101 and 104. The first and second buses 101 and 104 are connected with the first and second bus memories 100, 103, but can be connected with a device requiring a certain data transmission.

An operation of the interbus data flow control system and method according to the present invention will now be described.

In FIG. 3, to transfer data from the first bus 101 to the second bus 104, data stored in the first memory 100 is output to the first bus 101, and the data is transmitted to the byte selection unit 106 through the first bus interface 102.

The byte selection unit 106 byte-swaps or byte-samples the received data in accordance with a byte selection control signal output from the byte selection control unit 107 to realign the data and to output the realigned data to the second bus interface 105.

The byte selection control signal output from the byte selection control unit 107 includes at least one of a plurality of prestored byte selection data 112 as shown in FIG. 4. The byte selection data 112 are used to control and program the byte selection unit 106. The byte selection unit 106 receives the byte selection control signal and realigns the data received from the first bus interface 102 in accordance with the byte selection control signal. Here, the realignment of data involves byte-swapping or byte-sampling the data and outputting the resultant data to the second interface 105.

FIG. 4 is a table illustrating the plurality of byte selection data 112 previously defined in the byte selection control unit 107. Although the byte selection data 112 are stored in the byte selection control unit 107, the same may be stored separately as needed. The byte selection data 112 are output to the byte selection unit 106 under the control of an external control apparatus. The byte selection data 112 allow the byte-swapping or byte-sampling of input data byte 108. For example, as shown in FIG. 4, if the byte selection data of "F" is input to the byte selection unit 106, the byte "BF" of the input data bytes 108 will be swapped, output to the "R[0]" position of output data bytes 109, and stored in the second bus interface 105. Similarly, if the byte selection data of "E" is input to the byte selection unit 106, the byte "BF" of the input data bytes 108 is output to the "R[1]" position of the output data bytes 109 and stored in the second bus interface 105. Accordingly, the byte selection data 112 determine and control the byte-swapping operation of the realigning process according to the present invention.

Figure 5:
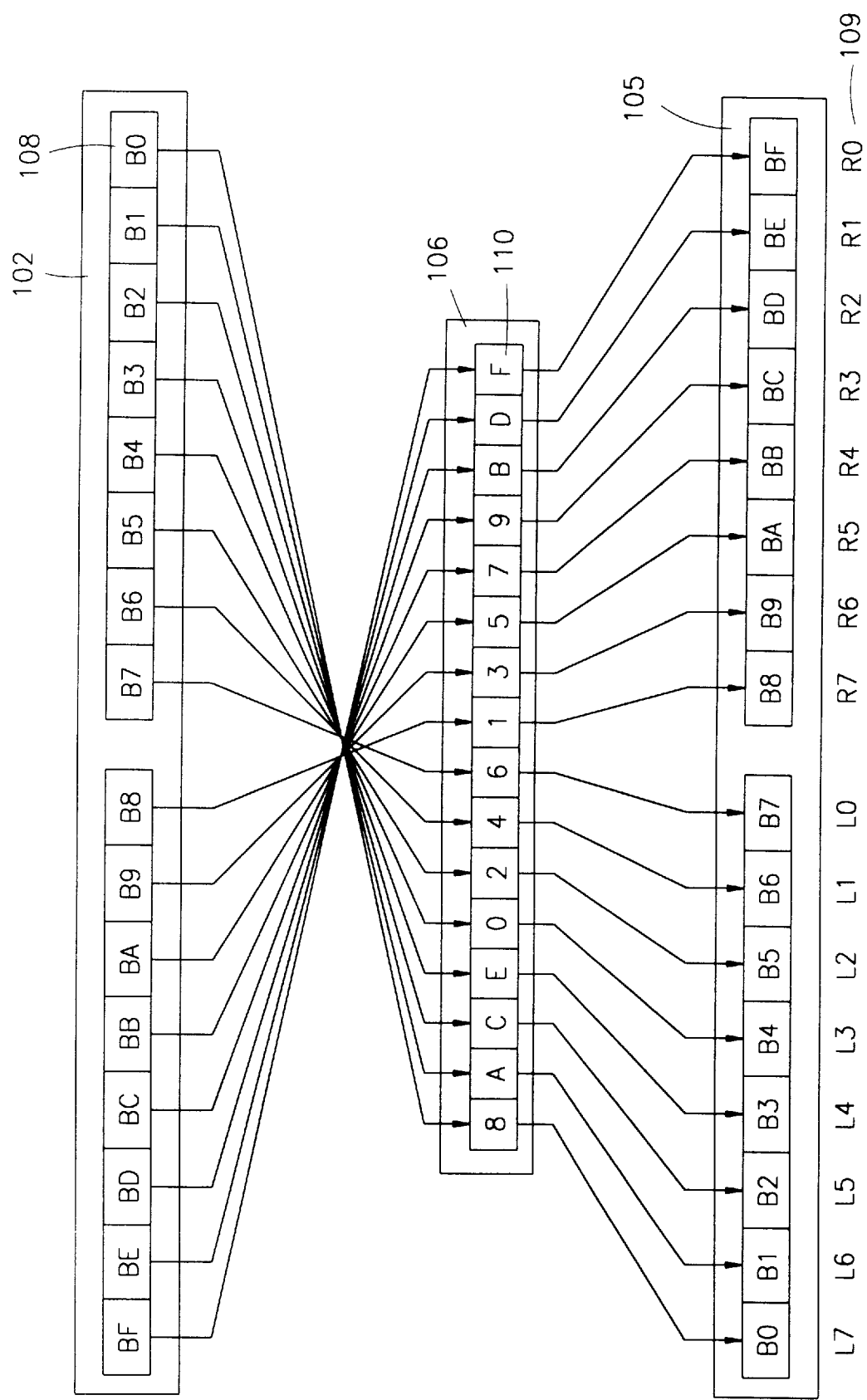
FIG. 5 is a view illustrating a byte-swapping operation of a realigning process performed by a data selection unit of the control system shown in FIG. 3 according to the present invention.

Referring to an example shown in FIG. 5, the input data bytes 108 are received by the first bus interface 102 and the byte selection data 110 (8, A, C, E, 0, 2, 4, 6, 1, 3, 5, 7, 9, B, D, F) are input to the byte selection unit 106 from the byte selection control unit 107. According to the byte selection data serving as a control signal, the input data bytes 108 are rearranged/realigned into output data bytes 109 and are output to the second interface 105.

More specifically, the byte "B0" of the input data byte 108 is transferred to the byte location "L7" of the output data bytes 109 in accordance with the first byte selection data "8", and the byte "B1" of the input data bytes 108 is transferred to the byte location "L6" of the output data bytes 109 according to the byte selection data "D", and so on. In this byte-swapping operation, all the input data bytes 108 are rearranged in reverse order in accordance with the byte selection data of the byte selection unit 107 to output realigned data.

The realigned data output to the second bus interface 105 are transmitted through the second bus 104 to the second memory 103 or to an external apparatus. Accordingly, the data swapping operation according to the present invention is performed.

Figure 6:
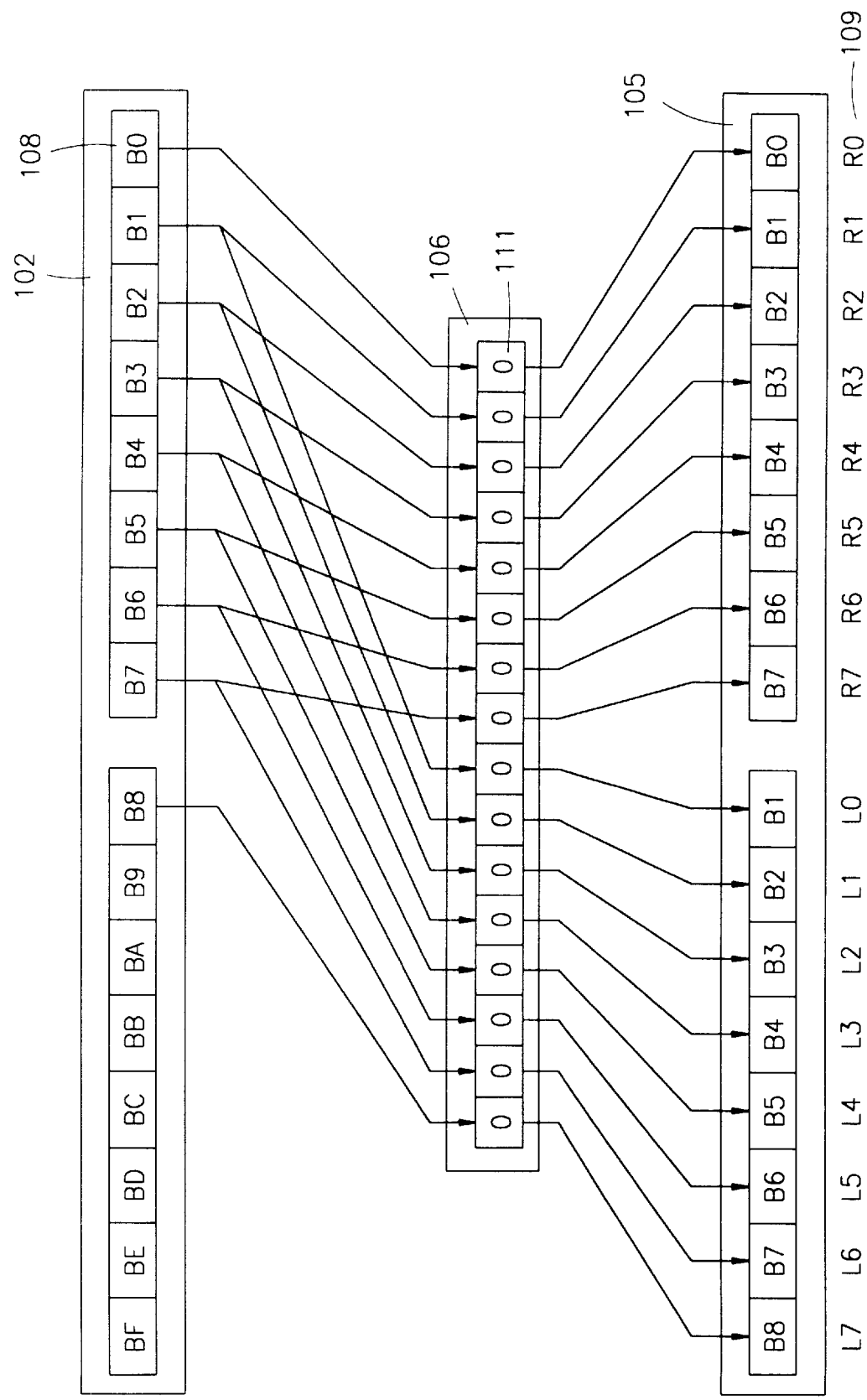
FIG. 6 is a view illustrating a data sampling operation of a realigning process performed by the data selection unit of the control system shown in FIG. 3 according to the present invention.

To perform a byte-sampling operation as shown in FIG. 6 according to the present invention, the byte data on the first bus 101 are sampled according to the byte selection data (control signal) 111 from the byte selection control unit 107. For example, the byte selection data of "0, 0, 0, 0, 0, 0, 0, 0, 0, 0, 0, 0, 0, 0, 0, 0" are input to the byte selection unit 106 to rearrange certain bytes (B0–B8) of the input data bytes 108 and to generate the output data bytes 109. An external apparatus controls which byte selection data is to be output to the byte selection unit 106.

The realigned data output to the second bus interface 105 are stored in the second memory 103 through the second bus 104 or transmitted through the second bus 104 to an external apparatus.

The above-described data transmission processes are performed in reverse order when the data are transmitted from the second bus 104 to the first bus 101 and the operations of the byte selection unit 106 and the byte selection control unit 107 for transmitting data which are similar to transferring data from the first bus 101 to the second bus 104 are performed as well. The data transmission processes include byte-sampling and byte-swapping.

The interbus data flow control system and method according to the present invention byte-swaps and byte-samples input data between buses having different characteristics and enables data transmission tailored to a data reception bus which receives the realigned data. Furthermore, a byte sampling is employed to prevent programming of a byte selection unit and to prevent unnecessary data transmission. The resulting expandability and flexibility of the present invention enhances implementation of various circuit compositions of the present invention. Here, a byte refers to a unit of a sequence of data bits where the unit may have 8 bits or other byte size.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. A system for controlling a data flow between data buses, comprising:
   a first bus;
   a first interface coupled to the first bus;
   a second bus;
   a second interface coupled to the second bus;
   a byte selection unit coupled to the first and second interfaces and transferring data from the first interface to the second interface, or from the second interface to the first interface according to a control signal; and
   a byte selection control unit storing a plurality of byte selection data and outputting at least one of the plurality of byte selection data to the byte selection unit as the control signal, each byte selection data mapping a byte location in one of the first and second interfaces to a predetermined byte location in the other of the first and second interfaces.

2. The system of claim 1, wherein the byte selection unit performs a byte-swapping operation on said data from the first interface according to the control signal from the byte selection control unit, and outputs the byte-swapped data to the second interface, the byte-swapping operation including a rearrangement of bytes of said data.

3. The system of claim 2, wherein the second interface transfers the byte-swapped data to the second bus.

4. The system of claim 3, further comprising:
   a second bus memory coupled to the second bus and receiving the byte-swapped data from the second bus.

5. The system of claim 1, wherein the byte selection unit performs a byte-swapping operation on said data from the second interface according to the control signal from the byte selection control unit, and outputs the byte-swapped data to the first interface, the byte-swapping operation including a rearrangement of bytes of said data.

6. The system of claim 5, wherein the first interface transfers the byte-swapped to the first bus.

7. The system of claim 6, further comprising:
   a first bus memory coupled to the first bus and receiving the byte-swapped data from the first bus.

8. The system of claim 1, wherein the byte selection unit performs a byte-sampling operation on said data from the first interface according to the control signal from the byte selection control unit, and outputs the byte-sampled data to the second interface, the byte-sampling operation including sampling of bytes of said data.

9. The system of claim 8, wherein the second interface transfers the byte-sampled data to the second bus.

10. The system of claim 9, further comprising:
    a second bus memory coupled to the second bus and receiving the byte-sampled data from the second bus.

11. The system of claim 1, wherein the byte selection unit performs a byte-sampling operation on said data from the second interface according to the control signal from the byte selection control unit, and outputs the byte-sampled data to the first interface, the byte-sampling operation including sampling of bytes of said data.

12. The system of claim 11, wherein the first interface transfers the byte-sampled data to the first bus.

13. The system of claim 12, further comprising:
    a first bus memory coupled to the first bus and receiving the byte-sampled data from the first bus.

14. The system of claim 1, wherein the byte selection unit performs a data realigning process on said data from the first or second interface according to the control signal from the byte selection control unit, the data realigning process including at least one of a byte-swapping operation and a byte-sampling operation, the byte-swapping operation including a rearrangement of bytes of said data, the byte-sampling operation including sampling of bytes of said data.

15. The system of claim 1, wherein the plurality of byte selection data represent different byte locations.

16. A method of controlling a data flow between data buses, comprising the steps of:
    coupling a first interface to a first bus;
    coupling a second interface to a second bus;
    generating at least one of a plurality of byte selection data as a control signal, each byte selection data mapping a byte location in one of the first and second interfaces to a predetermined byte location in the other of the first and second interfaces; and
    transferring data from the first interface to the second interface, or from the second interface to the first interface according to the generated control signal.

17. The method of claim 16, wherein the transferring step includes:

performing a byte-swapping operation on said data from the first interface according to the generated control signal, the byte-swapping including a rearrangement of bytes of said data; and outputting the byte-swapped data to the second interface.

18. The method of claim 17, further comprising:

transferring the byte-swapped data from the second interface to the second bus and to a second bus memory coupled to the second bus.

19. The method of claim 16, wherein the transferring step includes:

performing a byte-swapping operation on said data from the second interface according to the generated control signal, the byte-swapping operation including a rearrangement of bytes of said data; and outputting the byte-swapped data to the first interface.

20. The method of claim 19, further comprising:

transferring the byte-swapped data from the first interface to the first bus and to a first bus memory coupled to the first bus.

21. The method of claim 16, wherein the transferring step includes:

performing a byte-sampling operation on said data from the first interface according to the generated control signal, the byte-sampling operation including sampling of bytes of said data; and outputting the byte-sampled data to the second interface.

22. The method of claim 21, further comprising:

transferring the byte-sampled data from the second interface to the second bus and to a second bus memory coupled to the second bus.

23. The method of claim 16, wherein the transferring step includes:

performing a byte-sampling operation on said data from the second interface according to the generated control signal, the byte-sampling operation including sampling of bytes of said data; and outputting the byte-sampling data to the first interface.

24. The method of claim 23, further comprising:

transferring the byte-sampled data from the first interface to the first bus and to a first bus memory coupled to the first bus.

25. The method of claim 16, wherein the transferring step includes:

performing a data realigning process on said data from the first or second interface according to the control signal, the data realigning process including at least one of a byte-swapping operation and a byte-sampling operation, the byte-swapping operation including rearranging bytes of said data, the byte-sampling operation including sampling bytes of said data.

26. The method of claim 16, wherein in the generating step, the plurality of byte selection data represent different byte locations.

27. A system for controlling a data flow between data buses, comprising:

a first bus;

a first interface connected to the first bus, the first interface containing a plurality of first byte locations;

a second bus;

a second interface connected to the second bus, the second interface containing a plurality of second byte locations;

a byte selection control unit storing a plurality of byte selection data, each of which maps a first byte location in the first interface to a second byte location in the second interface according to a value of the byte selection data, the byte selection control unit sequentially outputting the plurality of byte selection data as a control signal; and a byte selection unit connected between the first and second interfaces to transfer data from the first interface to the second interface according to the control signal.

28. The system of claim 27, wherein the plurality of byte selection data map all of the first byte locations to all of the second byte locations.

29. The system of claim 28, wherein the data in the first byte locations are arranged in reverse order in the second locations.

30. The system of claim 27, wherein the plurality of byte selection data map less than all of the first byte locations to all of the second byte locations.

31. The system of claim 30, wherein a portion of the data in the first byte locations is realigned in the second locations.

* * * * *